Nov. 18, 1941.                E. BRUST                2,263,161
                            ANIMAL TRAP
                        Filed Dec. 15, 1939
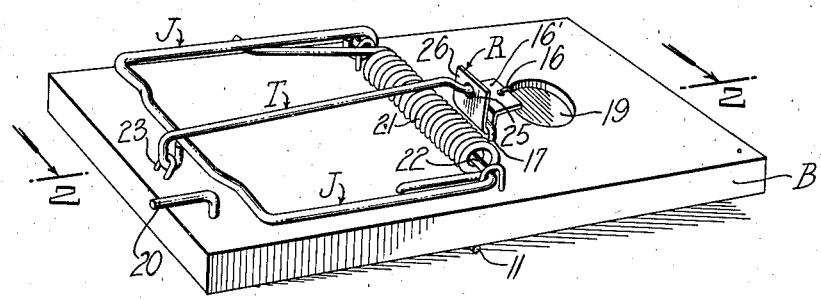
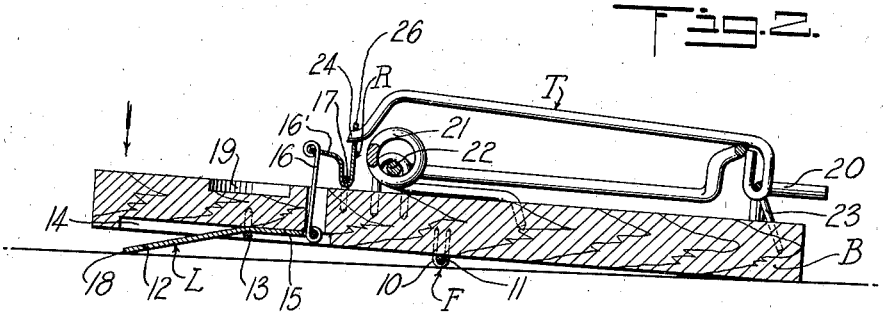
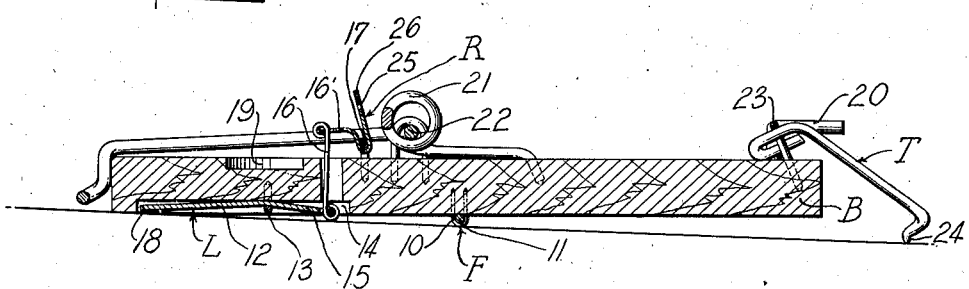
INVENTOR
Erich Brust Patented Nov. 18, 1941

2,263,161

UNITED STATES PATENT OFFICE 2,263,161

ANIMAL TRAP

Erich Brust, Coytesville, N. J.

Application December 15, 1939, Serial No. 309,429

4 Claims. (Cl. 43—81)

The present invention relates to animal traps and in particular to improvements in traps comprising a spring-actuated jaw and a cooperating release mechanism.

In traps of this type it has been customary heretofore to attach the bait to the trigger release or at least place it in contact therewith, the springing of the trap depending entirely on a motion imparted to the release either directly or through the bait. Removal of the bait by the animal without setting the release in motion thus resulted in frequent failure of the trap.

It is therefore among the objects of this invention to provide a trap which will positively be sprung without requiring the animal to make direct contact with the release or the bait. Another object of the invention is to provide a trap of greatly increased sensitivity and simple, cheap and efficient construction. A further object of the invention is an improvement in the construction of animal traps that does not require any major changes in the principal mechanical elements of the customary traps.

With these and other objects in view, the invention consists essentially in a trap having a base carrying a spring-actuated jaw and capable of rocking about a fulcrum, and very sensitive means for automatically releasing the jaw the moment one end of the base is engaged and depressed to rock the latter slightly about its fulcrum.

The invention is illustrated by way of example in the accompanying drawing, in which:

Fig. 1 is a perspective view of the trap in operative position;

Fig. 2 is a central longitudinal section of the trap when taken along line 2—2 in Fig. 1; and Fig. 3 is a central longitudinal section of the trap in a closed position after it has been sprung.

In its broad aspect, the invention comprises a base B capable of rocking about a fulcrum F so located on the base that, when the trap normally rests on a supporting surface, the rear portion of the base is close to said surface and the front portion of the base is spaced or raised slightly above said surface. A pivoted spring-actuated jaw J overlies the rear portion of the base when the trap is set or open; and said jaw, when released, cooperates with the front portion of the base to close the trap. A lever L is pivotally connected intermediate its ends to the underside of the front portion of the base; and the end of one arm of this lever normally either just touches or is slightly spaced from the supporting surface while the end of the other lever arm is flexibly connected to a pivoted catch R which releasably engages a trigger T that normally holds the jaw J in its open position. Thus, slight depression of the front portion of the base B will operate the lever L and cause the catch R to disengage the trigger T, thereby releasing the jaw J which then automatically swings to its closed position.

The spring-actuated jaw J, as well as the catch R and the trigger T which constitute a releasable mechanism for normally retaining the jaw J in its open position, are all of conventional construction and their function is so well known in the art as not to require detailed explanation.

The fulcrum F may be provided in any desired manner and preferably has a rounded portion to contact the supporting surface and rock freely thereon. For example, the fulcrum may consist of a ridge extending across the lower surface of the base B which is desirably made of wood, and such ridge may be integral with the base or affixed thereto in any convenient way. The fulcrum may also be provided by a plurality of pins projecting from the under surface of the base B and extending along a straight line across said surface. As shown in the accompanying drawing, the fulcrum desirably consists of a row of lugs 10 formed by looped wires or staples secured in the base B. A bar 11 may extend through the loops and across the lower surface of the base B to prevent deformation of the loops. The distribution of weight or the position of the fulcrum is so chosen that when the trap is set, i. e., when the jaw J is in the open position as shown in Figs. 1 and 2, the base B will be in a tilted position in which the front portion carrying the lever L normally will be raised slightly above the floor or other supporting surface.

The lever L consists essentially of a wire or thin strip 12 of flexible metal bent so as to provide two arms which form an obtuse angle with one another. A staple 13 serves as pivot for the lever L and secures it to the base B. A recess 14 is preferably provided in the lower surface of the base B for receiving the lever L. Attached to the extreme end of one arm 15 of the lever L is a wire 16 connecting the lever with one leg 16' of the catch R which is pivoted by a staple 17 to the top surface of the base B. The extreme end of the other arm 18 of the lever L preferably is arranged so that it will touch the floor and yieldingly support part of the weight of the portion of the trap in front of the fulcrum. To increase the stability of the trap, the lever L, catch R and trigger T preferably are disposed in the same central longitudinal plane perpendicular to the base B, and the width of the strip forming the lever also contributes to such stability.

The bait may be fastened to the catch R or a depression 19 may be provided in the top surface of the front portion of the base B for receiving the bait, since the latter serves simply as a lure. It will be noted that both the catch R and the depression 19 are situated on the same portion of the base B to which the lever L is secured. In the other or rear portion of the base B a safety latch 20 is provided, which may consist of a bent wire rotatably secured at one end in the base B and adapted to be turned to position its horizontal end over the jaw J, so as to retain the jaw in its open position while the trap is being set. As is well known, the jaw J may be actuated by a spring 21 to swing about a bar 22; and it may be held in open position by the trigger T which is pivotally secured by a staple 23 to the base B and has a free end 24 which normally projects a short distance through a hole 25 in one leg 26 of the catch R.

The trap operates as follows: When the jaw J is set in its open position and retained therein by causing the trigger T to engage in aperture 25 in the catch R, the base B will be tilted on its fulcrum as shown in Figs. 1 and 2, thereby spacing the front portion of the base from the surface supporting the trap. In this position part of the weight of the trap desirably is supported by the end of lever L. The load on the end 18 preferably is just insufficient to overcome the frictional resistance caused primarily at the point of engagement between the trigger T and the catch R. However, the slightest increase in this load, exerted by an animal pressing upon the front portion of the base B where the bait is located, will immediately exceed this frictional resistance and cause the base B to rock about the fulcrum F, thereby decreasing the distance between the lower surface of the raised end of the base B and the floor. In consequence thereof, the arm 12 of the lever L moves toward the recess 14 and the lever pivots about the pin 13, thus causing the arm 15 to move downwardly. Such downward movement exerts a pull on the wire 16, resulting in a tilting of the catch R about its pivot 17, thereby disengaging the trigger T. Disengagement of the trigger releases the jaw J which permits the spring 21 to forcibly swing the jaw around the bar 22 and against the front end of the base B to trap the animal.

The trap embodying this invention is simple and compact, and is exceedingly sensitive to light forces applied against the raised front portion of the base. The force required to tilt the trap and close it may be varied by changing the positions of the fulcrum F and the lever L, or by changing the length of the lever L. Since these and other changes may be made in the construction disclosed herein without departing from the principles of my invention, I do not limit myself to the precise details herein shown and described.

I claim:

1. A trap comprising, in combination, a base having a fulcrum adapted to engage a supporting surface to normally space the front portion of said base from said surface; a spring actuated jaw cooperating with said front portion to close the trap; releasable mechanism mounted on the top side of said base and normally retaining said jaw in its open position; and means for releasing said mechanism to permit said jaw to spring to its closed position, said means comprising a lever pivotally secured to the bottom side of said base and rockable about its pivot when the front portion of said base is depressed toward said surface, said base having an aperture therethrough and said releasing means including an element extending through said aperture and being connected both to said mechanism and to said lever.

2. A trap as claimed in claim 1, in which said lever has two arms, the extreme end of one arm of said lever is adapted to engage said surface and support some of the weight of the front portion of said base, and the other lever arm is flexibly connected to said releasable mechanism.

3. A trap comprising, in combination, a base having an aperture therethrough and also having a fulcrum extending across the bottom side of said base between its front and rear ends, said fulcrum being adapted to rockably engage a supporting surface and to space the front portion of said base from said surface; a spring-actuated jaw normally overlying the top side of the rear portion of said base and adapted to cooperate with said front portion to close the trap; releasable mechanism, comprising a trigger and a catch for said trigger, for normally retaining said jaw in its open position; and means for releasing said mechanism to permit said jaw to spring to its closed position, said means comprising a two-armed lever pivotally secured between its ends and to the bottom side of said base between said fulcrum and the front end of said base, an element extending through said aperture in the base and connecting said catch to one arm of said lever, the other arm of said lever extending forwardly toward the front end of said base and downwardly away from said base, the extreme free end of said other arm being arranged to engage a supporting surface and be thrust upwardly thereby when the front portion of said base is depressed.

4. A trap as claimed in claim 3, in which said fulcrum has a rounded portion to engage the supporting surface; said lever is formed of a strip of sheet metal; and said trigger, catch, lever and element are arranged symmetrically relatively to a perpendicular plane extending centrally and longitudinally of said base.

ERICH BRUST.